US010837423B2

(12) United States Patent
Zhou

(10) Patent No.: US 10,837,423 B2
(45) Date of Patent: Nov. 17, 2020

(54) ROTOR REINFORCING DEVICE FOR WIND TURBINE

(71) Applicant: Fang Zhou, Oviedo, FL (US)

(72) Inventor: Fang Zhou, Oviedo, FL (US)

( * ) Notice: Subject to any disclaimer, the term of this patent is extended or adjusted under 35 U.S.C. 154(b) by 96 days.

(21) Appl. No.: 15/772,939

(22) PCT Filed: Aug. 11, 2016

(86) PCT No.: PCT/CN2016/094592
§ 371 (c)(1),
(2) Date: May 2, 2018

(87) PCT Pub. No.: WO2017/076095
PCT Pub. Date: May 11, 2017

(65) Prior Publication Data
US 2018/0320655 A1    Nov. 8, 2018

(30) Foreign Application Priority Data
Nov. 3, 2015    (CN) .......................... 2015 1 0737031

(51) Int. Cl.
*F03D 1/06*    (2006.01)
*F03B 17/06*    (2006.01)
*F03B 13/26*    (2006.01)

(52) U.S. Cl.
CPC .......... *F03D 1/0666* (2013.01); *F03B 13/264* (2013.01); *F03B 17/06* (2013.01); *F03B 17/061* (2013.01); *F05B 2240/21* (2013.01); *F05B 2240/24* (2013.01); *F05B 2240/50* (2013.01); *F05B 2240/917* (2013.01); *F05B 2280/6003* (2013.01); *Y02E 10/72* (2013.01)

(58) Field of Classification Search
CPC ...... F03D 1/0666; F03B 17/061; F03B 17/06; F03B 13/264; Y02E 10/721; Y02E 10/725; F05B 2240/917; F05B 2280/6003; F05B 2240/50; F05B 2240/24; F05B 2240/21
See application file for complete search history.

(56) References Cited

U.S. PATENT DOCUMENTS

| 2,029,503 | A | * | 2/1936 | Peterson | B64C 11/006 416/89 |
| 2,516,576 | A | * | 7/1950 | Jacobs | F03D 7/0236 416/135 |
| 4,632,637 | A | * | 12/1986 | Traudt | F03D 1/0608 416/11 |
| 5,599,168 | A | * | 2/1997 | Lund | F03D 7/0236 416/135 |
| 6,227,803 | B1 | * | 5/2001 | Shim | F03D 7/0236 416/44 |
| 7,071,578 | B1 | * | 7/2006 | Shibata | F03D 7/0236 290/44 |

(Continued)

*Primary Examiner* — Michael C Zarroli

(57) ABSTRACT

A rotor reinforcing device to reinforce turbine rotor comprises a center connecting device which is fixed on a rotor hub, blade reinforcing members which are connected to the center connecting device and corresponding rotor blade, and guide structures which are configured to guide the blade reinforcing members to rotate around a longitudinal axis of the rotor blade. The rotor reinforcing device may be used to reinforce a rotor, a rotor-based wind turbine, a rotor-based ocean current turbine, a rotor-based tidal turbine and a rotor-based power generator.

18 Claims, 11 Drawing Sheets

(56) References Cited

U.S. PATENT DOCUMENTS

| | | | | |
|---|---|---|---|---|
| 7,186,083 | B2* | 3/2007 | Bayly | F03D 9/25 |
| | | | | 416/51 |
| 8,215,911 | B2* | 7/2012 | Grabau | H02G 13/00 |
| | | | | 416/146 R |
| 8,231,347 | B2* | 7/2012 | Dawson | F03D 1/0675 |
| | | | | 416/211 |
| 8,334,610 | B2* | 12/2012 | Migliori | F01D 17/10 |
| | | | | 290/44 |
| 8,629,570 | B1* | 1/2014 | Kamenov | F03B 13/06 |
| | | | | 290/44 |
| 8,821,121 | B2* | 9/2014 | Carter | F03D 1/0666 |
| | | | | 416/135 |
| 9,629,570 | B2* | 4/2017 | Bar-Tal | A61B 5/6852 |
| 9,822,760 | B2* | 11/2017 | Tahar | F03D 1/0633 |
| 2008/0124216 | A1* | 5/2008 | Liao | F03D 1/0675 |
| | | | | 416/24 |
| 2011/0031763 | A1* | 2/2011 | Fuglsang | F03D 1/0658 |
| | | | | 290/55 |
| 2012/0051914 | A1* | 3/2012 | Dehlsen | F03D 7/0224 |
| | | | | 416/147 |

* cited by examiner

ROTOR REINFORCING DEVICE FOR WIND TURBINE

CROSS-REFERENCE TO RELATED APPLICATIONS

This application is a 35 U.S.C.371 National Phase Entry Application from PCT/CN2016/094592, filed Aug. 11, 2016. This application also claims the benefit of China Patent Application No. 201510737031.X (CN), filed Nov. 3, 2015.

FIELD OF THE INVENTION

The present invention relates to a rotor reinforcing device preferably applied in wind turbine generator system especially in horizontal-axis wind turbine. The present invention also relates to the rotors with this rotor reinforcing device and this rotor-based wind turbine, ocean current turbine as well as tidal turbine.

BACKGROUND OF THE INVENTION

As a kind of clean and renewable energy, wind energy has developed rapidly in recent years. To compete with conventional energy sources (as coal, petroleum, natural gas, large and medium-size hydropower), it is important for the clean and renewable energy to reduce costs and improve its operating efficiency. Nowadays, the wind turbine around the world shows a developing trend towards large power and long blades. In addition, large horizontal-axis wind turbines have a cost advantage in terms of manufacturing, installation and operation. For wind turbine, its unit cost will reduce with the increase of single-unit power.

Energy is generated by blades transmitting torque. In spite of no limitation by theory, it is believed that energy produced by a horizontal-axis wind turbine is proportional to the square of the length of its blade, while the increase of the weight of blade material is in proportion to the cube of the length of its blade. With the lengthening of the blade, the aerodynamic loading will increase accordingly, also the weight of blade material will increase. Due to such increase of the aerodynamic loading, larger wind turbine blade requires higher bending resistance, which means the material of the blade to be thicker, and in this case, the weight of the blade increases accordingly.

For large blade, its stiffness is the main problem needing to be considered. To prevent the blade tips from colliding with the tower under extreme wind load, the blades must have adequate bending stiffness, but this will increase the weight of the blade. The weight of blade material has a significant influence on the operation, fatigue life and energy output of the wind turbine.

Besides, it's hard to transport a large blade, This has increasingly become a bottleneck constraining the development of wind power. As a result, long-distance transport of even larger wind turbine blade in full scale is likely to be more difficult in the future.

In addition, in the modern design of wind turbine blade, its shape shall be designed to reach a balance between the aerodynamic efficiency and structural reasonability so as to achieve the highest efficiency at the lowest cost.

FIG. 1 shows the cross sectional view of an exemplary blade, where it can be seen that the wind turbine blade 1' may comprise the blade shell 2 and the beam 3 in the shell 2. The beam 3, in rectangle shape, e.g., contains two main beams 4 fixed inside the shell and anti-shearing webs 5 for the connection of the two main beams that are covered by the blade shell which creates aerodynamic force. The main bending load is mostly supported by the main beam, and a little by the blade shell. The weight of the main beams is especially a major part of the blade.

One of the common blade materials is glass fiber reinforced polymer (GFRP). For example, both the main beams and the shell of the blade can be made of GFRP. However, for a large blade made of GFRP, its main beams have to be very thick to meet the strength and stiffness requirements for the blade, so the blade is inevitably heavy. During the operation of a wind turbine, the gravity of the blade produces alternating load which induces the fatigue stress in the blade, so that the blade is likely to reach the fatigue strength in advance, as the weight of the blade increases. That is, to enhance the strength of the blade, it has to increase its weight, and this will requires the increase of the weight of other structures of the wind turbine including the hub, the tower, etc. As a result, the overall cost of the wind turbine will greatly increase, as well as the unit cost.

To reduce the weight of the blade and meet the requirements of strength and stiffness of the blade at the same time, carbon fiber reinforced plastic (CFRP) instead of GFRP is used to make the main beam, but CFRP is very expensive.

Therefore, it has become an urgent problem in the wind power development to improve the strength and stiffness and reduce the weight of the large blade at the same time to lower the cost.

The China patent with the application publication No. CN101230834A involves "a tension type wind turbine rotor" of which the blades are divided into two stages and in the middle center shaft seats are set up and the three center shaft seats are connected in a regular triangle by composite materials with streamline cross section. In this case, when the blades are in different force status under the gravity, the unbalanced external force can be offset partially; the three center shaft seats and fore and rear ends of the hub also adopt similar tension type wind turbine rotor.

The U.S. patent with the application publication No. US2010/0086407A1 relates to a wind turbine rotor comprising one or more rotor blades and stiffening elements to stiffen the rotor, where the rotor blades are arranged such that they can turn around their longitudinal axes relative to corresponding rotor stiffening elements. Each rotor blade may comprise at least two rotor blade parts where the outer rotor blade part may be turnably arranged relative to the inner rotor blade part. Besides, the wind turbine rotor includes the stiffening elements and spacing elements to strengthen the rotor blades and against its bending deflections. The wind turbine rotor also includes connection devices that connect the rotor stiffening elements together.

The above wind turbine rotors are required tension wires set up between the adjacent blades to balance the gravity of blades. Under the operation of a wind turbine, the blades vibrate in both the flapwise direction (out of the plane of rotation of the blades) and the edgewise direction (in the plane of rotation of the blades). Due to the tension wires, the dynamic response of the blades are more complex. It is not possible for all blades to vibrate totally synchronously, thus there are interaction effects among the blades, resulting in a possible increase of the amplitude and the maximum bending moment of the blade in the edgewise direction.

It is urgent to find a modified wind turbine with simple structure, but with higher strength and stiffness and also the weight of the blade can be reduced.

SUMMARY OF THE INVENTION

The present invention involves a rotor reinforcing device having lighter weight and simple structure.

In accordance with one embodiment of the present invention, a rotor reinforcing device is provided, comprising: a center connecting device that is fixed on the rotor hub; thin and long blade reinforcing members that are connected to center connecting device and corresponding rotor blades.

With the help of the center connecting device of the present invention, rotors can be easily reinforced. Especially, the blade reinforcing members are separated from other blades and connected to the central connecting device.

According to a preferred embodiment, the central connecting device comprises multiple connecting members which are configured as rotational symmetry. Such arrangement endows the rotor reinforcing device with higher capability.

According to a preferred embodiment, said center connecting device also comprises supporting structure for supporting said connecting members. This further enhances the stability of the central connecting device.

According to a specific embodiment, said supporting structure includes multiple supporting members that are connected with each other.

Preferably, said blade reinforcing member is a tensile reinforcement member.

Preferably, said blade reinforcing member adopts materials with high strength and high modulus, such as carbon fiber cable, which greatly reduces the weight and increases the strength and the stiffness of the blade.

Preferably, the rotor reinforcing device also includes a connecting bracket fixed in the rotor blade and used for connecting said blade reinforcing members and center connecting device. By the combination of blade reinforcing member, center connecting device and the connecting bracket, the rotor blade is likely to be relatively lighter but qualified with even higher bending strength and stiffness.

Preferably, said connecting bracket is designed as extending longitudinally along the blade span and fixed on the rotor blade after a certain interval. This can effectively ensure the stiffness of the blade.

In a particularly preferred embodiment, the rotor reinforcing device also contains a guide structure guiding the blade reinforcing members and the connecting bracket to rotate relative to the center connecting device. The guide structure can not only realize the reinforcing of the rotor but also the independent rotating or variable pitch of the blade.

According to a preferred embodiment, the said guide structure comprises a guiding member fixedly connected to connecting bracket and a guide slot in the center connecting device.

Preferably, the said guiding member includes bearings.

Preferably, the said guide slot has a circular arc-shaped, and may be designed up to about 180°.

According to another scheme of the present invention, a rotor comprises hubs, multiple blades connected to the said hubs, together with the rotor reinforcing device according to the present invention.

According to the other scheme of the present invention, a rotor comprises hubs, multiple blades connected to the said hubs, together with the rotor reinforcing device with a guiding member designed in the present invention. The said blades are structured such as able to rotate around their longitudinal axes relative to the hubs.

Preferably, each blade is equipped with at least one said blade reinforcing member and at least one connecting bracket. The said blades, blade reinforcing members and the corresponding connecting brackets are all separately arranged rotationally symmetric around the rotational axes of the rotor.

Preferably, each blade is equipped with multiple said blade reinforcing member of which at least two are connected to the same connecting bracket and extend parallelly so as to be connected to the blade at the roughly same lengthwise position.

Preferably, each blade is equipped with multiple blade reinforcing members of which at least two are connected to the same connecting bracket and connected to the blade at the different lengthwise positions.

Preferably, each blade is equipped with at least two groups of blade reinforcing members of which each group includes one blade reinforcing member or multiple blade reinforcing members that extend parallel to the roughly same lengthwise position of the blade, and wherein, the blade reinforcing members in different groups are connected to the same connecting bracket and connected to the blade at the different lengthwise positions.

Preferably, the blade reinforcing member is configured such as be applied to prestressed.

According to another scheme of the present invention, there is provided a wind power system comprising a rotor according to the present invention.

According to the other scheme of the present invention, there is provided a power generating equipment with the rotor is mentioned in the present invention, including wind turbine, ocean current turbine or tidal turbine.

Part of other characteristics and advantages of the present invention is obvious for the technician in this field who reads the present application. The other part is described in conjunction with the accompanying drawings in the following detailed description.

BRIEF DESCRIPTION OF THE DRAWINGS

The following detailed description of embodiments of the present invention seen in relationship with attached drawings, will give a more comprehensive understanding of the present invention.

DETAILED DESCRIPTION OF THE PREFERRED EMBODIMENT

Figure 1:
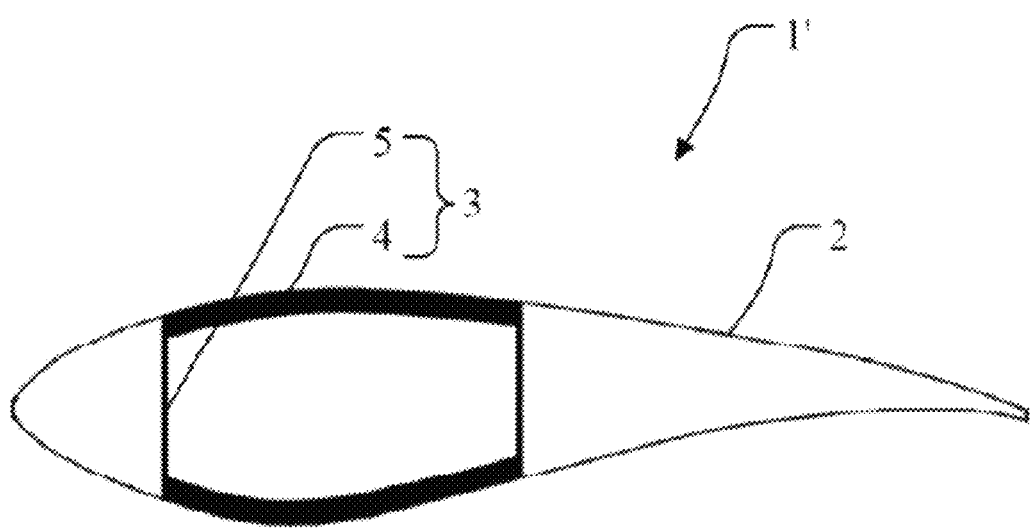
FIG. 1 presents cross-sectional view of an exemplary blade.

This is hereby to describe the specific embodiments of the present invention by referring to the drawings for a more comprehensive understanding of the technical characteristics, purposes and effects of the invention. Although the drawings are provided to present embodiments of the invention, their sizes are not necessarily drawn as the particular embodiments, certain features may be exaggerated or sectioned to better illustrate and explain the present invention. The phrase appears "in the drawings" or similar terms in the specification are not necessary to refer to all the drawings or examples.

Directional terms used for describing the drawings, e.g. "upper", "lower", "left", "right", "upwards", "downwards", etc. shall be understood to have its normal meaning when reading the accompanying drawings, which shall not be construed as specific limitation to the technical proposal of the appended claims.

The term "about" or "approximately" herein will be understood by the general technicians and will vary within certain range according to its context.

The embodiment of rotor reinforcing device applied in wind rotor based on the present invention is hereby described by referring to the figures. The rotor reinforcing device is applied in wind rotor, e.g. horizontal-axis wind turbine and preferred large-scale horizontal-axis wind turbine in accordance with the present invention embodiments. However, it can be inferred that the rotor reinforcing device based on the present invention can be applied in any applicable occasion using rotor blades, e.g. wind turbine, ocean current turbine and tidal current turbine as well.

Figure 2:
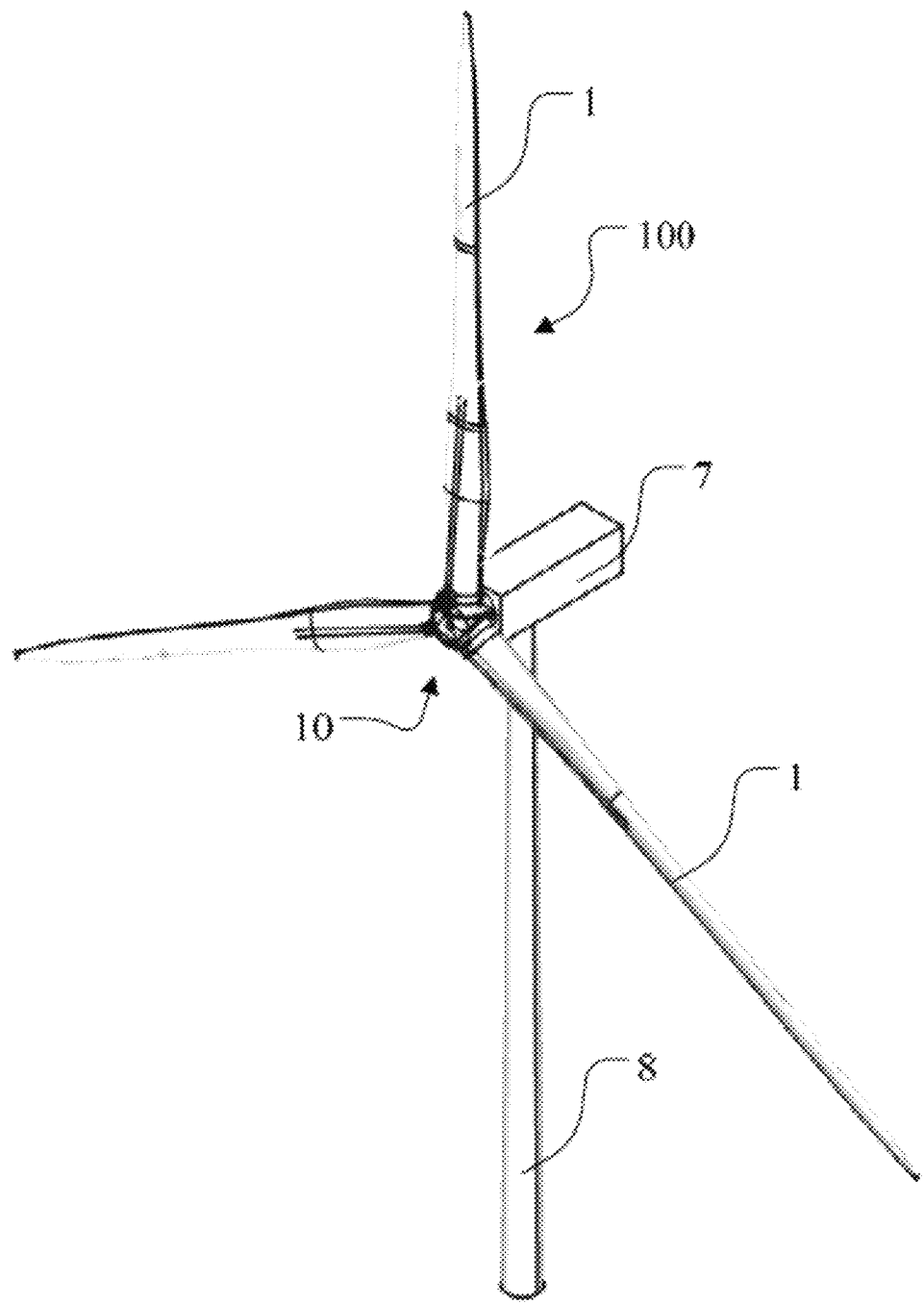
FIG. 2 presents space diagram of a rotor according to an embodiment of the present invention.

Even though not indicated, the embodiment of wind turbine includes a rotor and a generator. The rotor contains rotor 100 with hub 6 and multiple blades 1. Preferably, the hub 6 is set in the center of rotation axis of the rotor and said multiple blades 1 are uniformly arranged in circumference direction. As shown in FIG. 2, the rotor 100 in the shown embodiment contains 3 blades and it can be inferred that the rotor may contain more or less blades. Preferably, based on the present invention, the blade 1 may be rotated about the longitudinal direction of the blade 1, e.g. the blade is with variable pitch, and for details see the following content.

As is known, the wind power generator equipment, such as wind turbine may also include cabin 7 used for rotationally supporting the rotor 100 as and the tower 8 used for supporting said cabin 7. Preferably, the cabin 7 can rotationally support the hub 6 or rotating shaft (not indicated), so that the rotation of the rotor 100 is able to generate power through the drive mechanism contained in the cabin. Since the structures of cabin 7 and tower 8 are not critical, no unnecessary details will be given herein. Moreover, according to the present invention, the rotor 100 may be correspondingly applied to other wind power equipment, such as without any cabin and/or tower.

Rotors according to the embodiment of the present invention may also comprise rotor reinforcing device 10. Preferably, the rotor reinforcing device 10 may include center connecting device 40, slender blade reinforcing members 21-26 as well as the optional connecting structure, e.g. connecting bracket 11 as described below.

Blade 1 based on the embodiment of the present invention may be constructed as FIG. 1, comprising a blade shell 2 and the beam structure 3 covered by blade shell 2. As described above, the beam structure 3 as shown in the embodiment, may comprise a pair of main beam 4 and shear web 5. As previously mentioned, the blades as shown in the embodiment, including blade shell 2 and beam structure 3, may be made of glass fiber composite material. The involved technicians will understand that the blades based on the embodiment of the invention can assume different blade structures, materials and shapes. E.g. different beam structures and blade aerofoil profiles are applicable. E.g. the blade shell and the beam structure are made from different materials.

FIG. 2 presents the rotor 100 with rotor reinforcing device 10 based on the embodiment of the present invention. The rotor may be supported on the cabin 7, and the cabin 7 may be supported on the tower 8.

As shown in FIG. 2, the rotor reinforcing device 10 of the rotor 100 may be structured as rotational symmetry around the rotation axis. Particularly, the center connecting device 40 based on the present invention embodiment symmetrically connects the blade reinforcing members 21 and 22 of the three blades (not limited to three blades), which offsets part of pulling force of the blade reinforcing members 21 and 22 and reduces the disequilibrium load on the center connecting device 40. However, it can be inferred that even if it is not that preferable, the rotor reinforcing device 10 may not be rotational symmetry as well, or part of the rotor reinforcing device 10 is rotational symmetry.

Figure 3A:
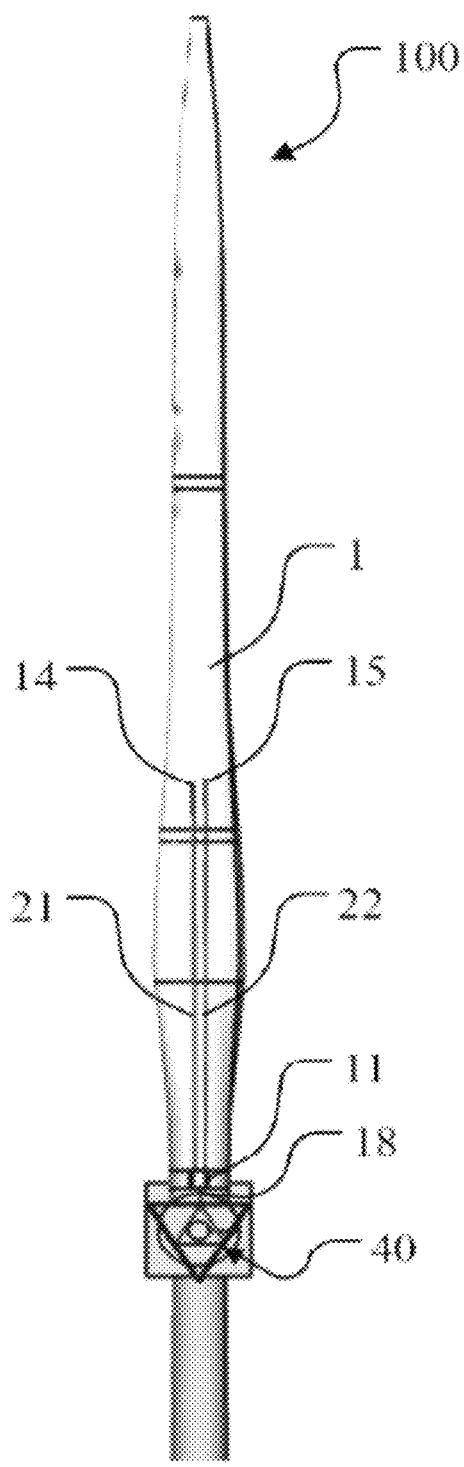
FIG. 3A presents partial front view of a rotor according to an embodiment of the present invention.
Figure 3B:
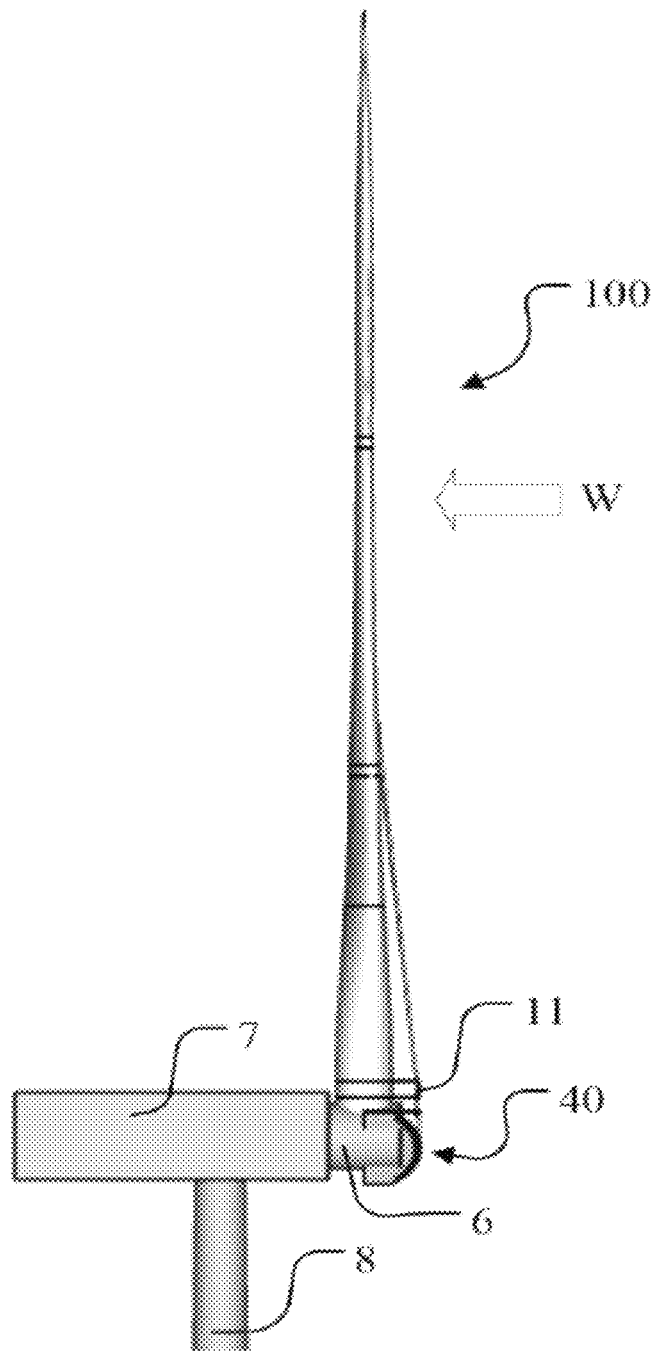
FIG. 3B presents partial side view of a rotor according to an embodiment of the present invention.

With continual reference to FIGS. 3A and 3B, they show the partial view of rotor 100 and rotor reinforcing device 10. Specifically, for clarity, the FIGS. 3A and 3B only show one of these blades 1 as well as the rotor reinforcing device 10 on the blade. The rotor reinforcing device 10 comprises center connecting device 40, (the first) connecting bracket 11 permanently connecting the blade 1 or the main beam and/or the shell of the blade, and a pair of slender blade reinforcing members 21 and 22 respectively connecting both ends of the connecting bracket 11 and directly connecting the blade at connecting points 14 and 15. Preferably, the connecting bracket 11 is connected to the center connecting device 10 in an inseparable way of relatively rotating around the center connecting device 40 (further described below). Although not shown in FIGS. 3A and 3B, the related parts of the rotor reinforcing device 10 may be correspondingly provided in the other blades of the rotor 100. With continual reference to FIGS. 3A and 3B, preferably, the connecting bracket 11 is at the connection position adjacent to the center connecting device 40, i.e. at the root of the blade, where one end (lower end) of the blade reinforcing members 21 and 22 respectively is connected to connecting bracket 11. The other end (upper end) of the blade reinforcing members 21 and 22 respectively is directly connected to blade 1 at proper middle position, e.g. connecting points 14 and 15. In the presented embodiment, the connecting points 14 and 15 of the blade reinforcing members 21 and 22 respective are in approximately the same position; however, it can be inferred that different positions of connecting points 14 and 15 are allowable.

Even though it has no intention to be limited by theoretical bounds, supposedly, it is equal to provide a fulcrum for blades, which can reduce the bending moment from the blade center to root, thus, the thickness of the main beam and shell can be reduced, so that the weight of blade can be reduced correspondingly. The connecting points 14 and 15 or other applicable connecting structures of the blade reinforcing members 21 and 22 are preset in proper position in production and manufacture of blades (as described below in conjunction with FIG. 10).

In the embodiment shown, the blade reinforcing members 21 and 22 are installed on both sides of the longitudinal axis of the blade, preferably pitch axis or aerodynamic center axis. The blade reinforcing members are installed at both sides, which is good for reducing the bending moment in flapwise direction and edgewise direction simultaneously. Even though the two blade reinforcing members in the given embodiment are respectively set at both sides of the longitudinal axis of the blade, we should know that more or less blade reinforcing members may be set, and the blade reinforcing members may be set in other forms, e.g. multiple blade reinforcing members are respectively, preferably and symmetrically or unsymmetrically set at both sides of said axis or extended along said axis or their combination.

With reference to FIGS. 4-7, the rotor reinforcing device 10 based on the present invention is further described in details.

Figure 4:
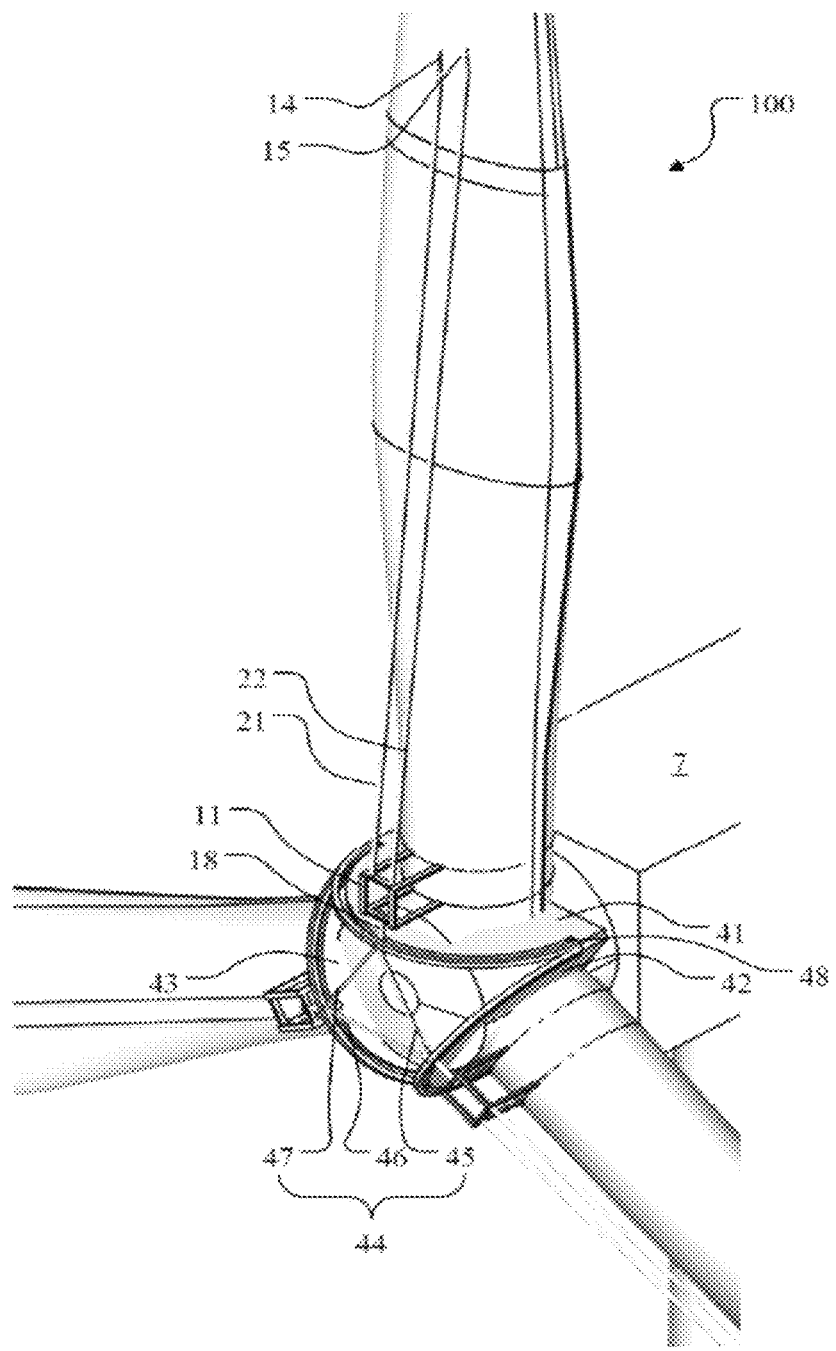
FIG. 4 presents partial enlarged drawing of the rotor according to an embodiment of the present invention.
Figure 6:
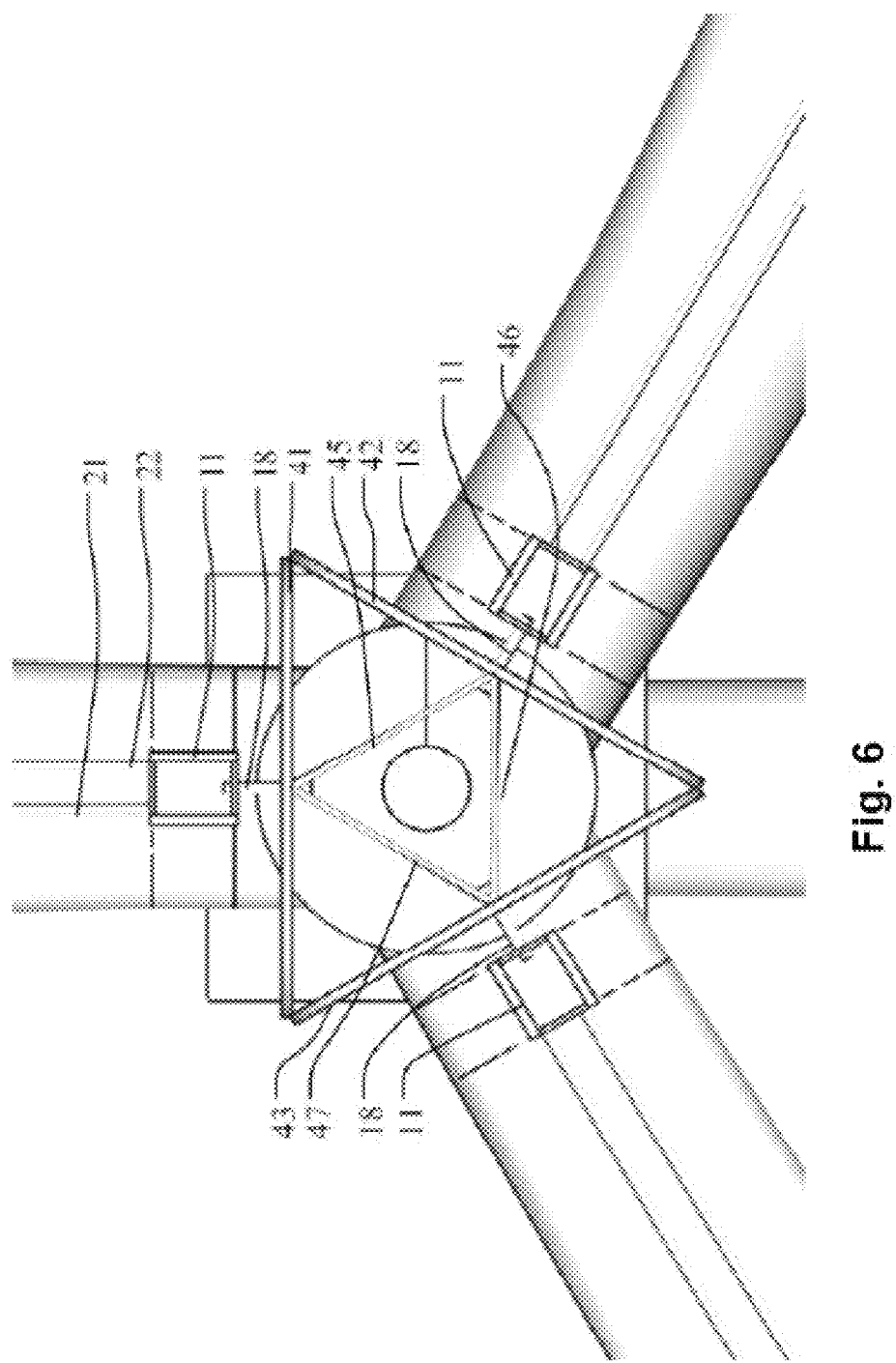
FIG. 6 presents the front view of the rotor in FIG. 5.

As shown in FIG. 4, the center connecting device 40 of rotor reinforcing device 10 may embrace multiple plate-shaped connecting members 41, 42 and 43 fixed on hub, and said connecting members are set rotational symmetry. In the given preferable embodiment, each blade is equipped with a plate-shaped connecting member, i.e. three plate-shaped connecting members in total, which form a triangle section (FIG. 6). It can be inferred that the quantity of plate-shaped connecting member may be different and/or be different from the quantity of the blades.

The plate-shaped connecting member may be made from any suitable materials, such as high strength steel. The said plate-shaped connecting member may be connected to the hub in any proper method, so as to rotate around the rotation axis together with hub, for example by welding method. Although the connecting member is configured into plate shape in the given embodiment, it can be inferred that the center connecting device may have connecting structures different from plate-shaped connecting member. For example, the shapes of the connecting member may be same to or different from each other, and combining different shapes and structures of said connecting member with the other characteristics of the present embodiment of the invention may obtain new embodiment of the invention, which are all within the scope of the present invention. In a preferable embodiment, each blade is equipped with a connecting member, preferably a plate-shaped connecting member, to the center connecting device, which are all within the scope of the invention.

As shown in FIG. 4, the center connecting device 40 of rotor reinforcing device 10 may embrace the supporting structure 44 used for supporting multiple plate-shaped connecting members 41, 42 and 43. In the given embodiment, said supporting structure 44 has triangle shape (FIG. 6), and may include multiple interconnected supporting members 45, 46 and 47. The triangle supporting structure 44 is respectively connected to the plate-shaped connecting members 41, 42 and 43 for providing support. It can be inferred that supporting structure in different shapes may be set to provide support and connection for the center connecting device or plate-shaped connecting member, which significantly increases the stiffness of the center connecting device 40.

Figure 5:
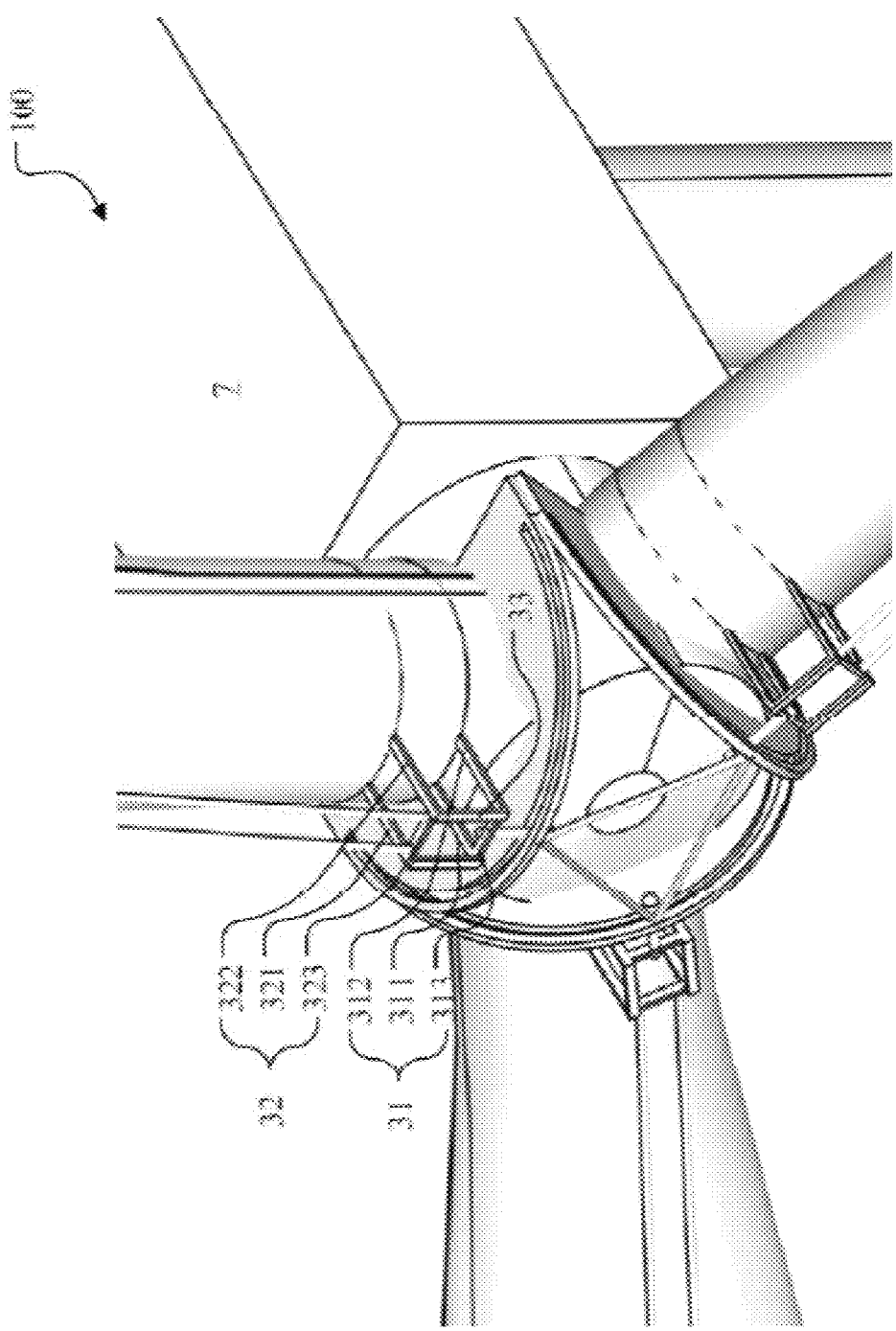
FIG. 5 presents partial enlarged drawing of a rotor according to an embodiment of the present invention, where the blade and the blade reinforcing members are located on the first position.
Figure 7:
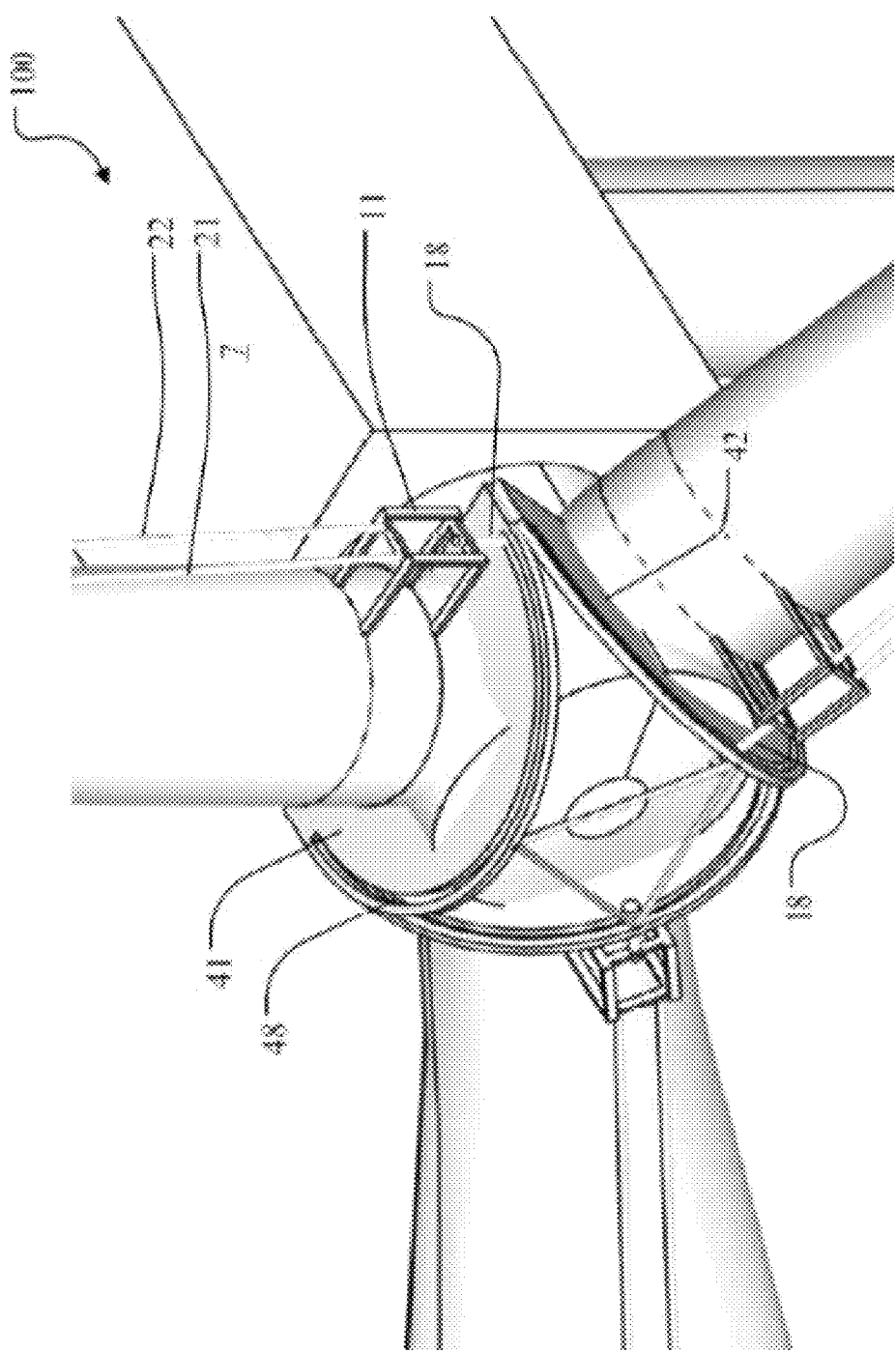
FIG. 7 presents partial enlarged drawing of a rotor according to an embodiment of the present invention, where the blade and the blade reinforcing members are located on the second position.

As shown in FIG. 4, the rotor reinforcing device 10 may also embrace the blade reinforcing members used for blades as well as the guide structure (not indicated) of the optional connecting bracket. In the embodiment shown, the guide structure may embrace the guide slot 48 set in the center connecting device 40 or the plate-shaped connecting members 41, 42 and 43 as well as the guide member permanently connected to the (first) connecting bracket 11. Preferably, the guide slot 48 may be in arc-shaped form, and more preferably, the arc-shaped slot may take the longitudinal rotational axis or the variable pitch axis of the blade as axis. In embodiment shown, the guide member may be in rolling bearing 18 form. Although not indicated, the rolling bearing 18 may have inner bearing part, outer bearing part and the rolling part between the inner and outer bearing parts, e.g. balls. The guide structure is especially applicable to the rotor blade able to rotating around the longitudinal axis of the blade, e.g. variable pitch blade. Particularly, by referring to FIGS. 5 and 7, the blade reinforcing members 21 and 22 and the optional connecting bracket may rotate with the blade in variable pitch axis but simultaneously be firmly and inseparably connected to the plate-shaped connecting member 41. For example, FIG. 5 shows the blade is in the first rotary position in the middle; correspondingly, the guide member of rolling bearing 18, the blade reinforcing members 21 and 22 as well as the optional connecting bracket 11 are in the first rotary position in the middle as well. By driving the blade to rotate or conduct variable-pitch rotation, the guide member of rolling bearing 18, the blade reinforcing members 21 and 22 as well as the optional connecting bracket 11 may be anticlockwise (as viewed from the top) rotated to the second rotary position as shown in FIG. 7. In this case, the position of the blade may be set independent of the other blades which may still be in the first rotary position in the middle as shown in the FIG. 7. Although not indicated, the rotating blade may make the corresponding blade reinforcing members and the optional connecting bracket be in different rotary positions along the arc-shaped guide slot. Thus, each blade is able to individually conduct variable pitch rotation, at the same time, it can make the blade reinforcing members 21 and 22 as well as the optional connecting bracket 11 firmly connect to the center connecting device 40, inseparably. Such a configuration is especially favorable. For example, in case of strong wind, the pitch angle can be adjusted to turn the blade into feathering status, so as to effectively protect the wind turbine.

With continued reference to FIG. 5, it shows a specific embodiment of the (first) connecting bracket 11 based on the present invention. Preferably, the connecting bracket 11 is configured to be fixed on the rotor blade 1 by crossing certain span longitudinally along the blade. The connecting bracket 11 may embrace the first leg 31, the second leg 32 longitudinally separated from the first leg 31 as well as the connecting rod 33 or any proper connecting elements permanently connecting said first leg and the second leg. By continuously referring to FIG. 5, the connecting bracket may be in frame shape, and preferably both said first leg 31 and the second leg 32 may be configured as a beam-type structure, e.g. it respectively includes preferable parallel column elements 311-312, 321-322 and beam elements 313 and 323. In preferable embodiment shown, the overall frame structure of the connecting bracket and the shape of the connecting elements are good for reducing the influence of aerodynamic on the blades, e.g. minimize the wind drag. However, the involved technician will understand that the connecting bracket may be in other structure or shape which shall be within the scope of the present invention. For example, the leg, columns elements, the beam elements and/or connecting elements can be different in quantity or shape.

Figure 8:
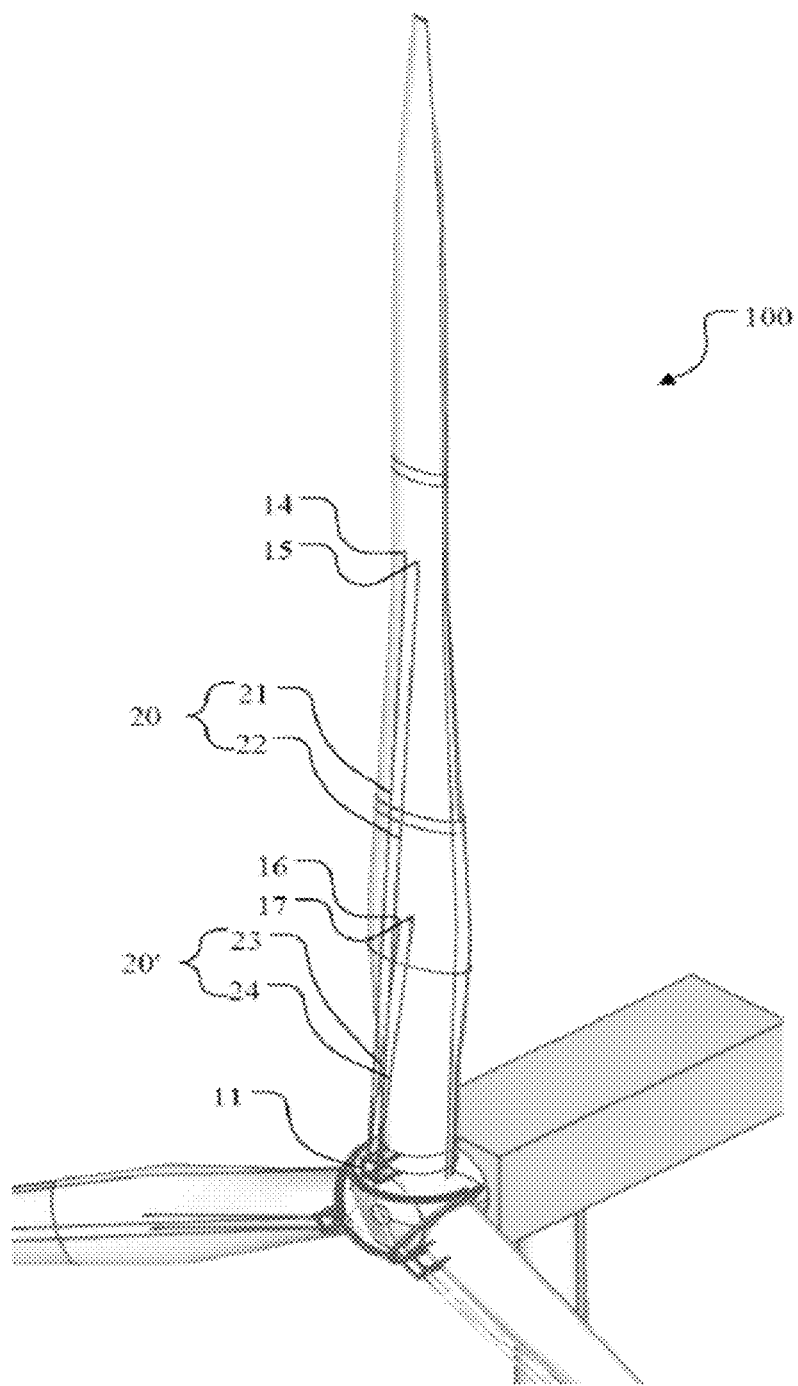
FIG. 8 presents space diagram of a rotor according to another embodiment of the present invention.

By referring to FIG. 8, it shows another embodiment of the present invention. In the embodiment as shown in FIG. 8, each blade is equipped with two groups of blade reinforcing members 20 and 20'. The blade reinforcing members 21 and 22 of the first group 20 are directly connected to the connecting bracket 11 at one end (the lower end) similarly in above-said method and to blade 1 at another end (the upper end) in the middle-upper position of the blade, e.g. connecting points 14 and 15. Further, in the embodiment illustrated, the blade reinforcing members 23 and 24 of the second group 20' are permanently connected to the connecting bracket 11 at one end (the lower end) in similar method.

However, the blade reinforcing members 23 and 24 of the second group 20' are directly connected to blade 1 in the longitudinal position closer than the connecting points 14 and 15, i.e. connecting points 16 and 17. This is equivalent to providing multiple fulcrums at different longitudinal positions, and reduces the bending moment of the blade main beam in this section. In the embodiment shown, each group of blade reinforcing member has two blade reinforcing members which are respectively located at both sides of the longitudinal axis of the blade. However, it can be inferred that the blade reinforcing member may be different in quantity and arranged in different ways.

Figure 9:
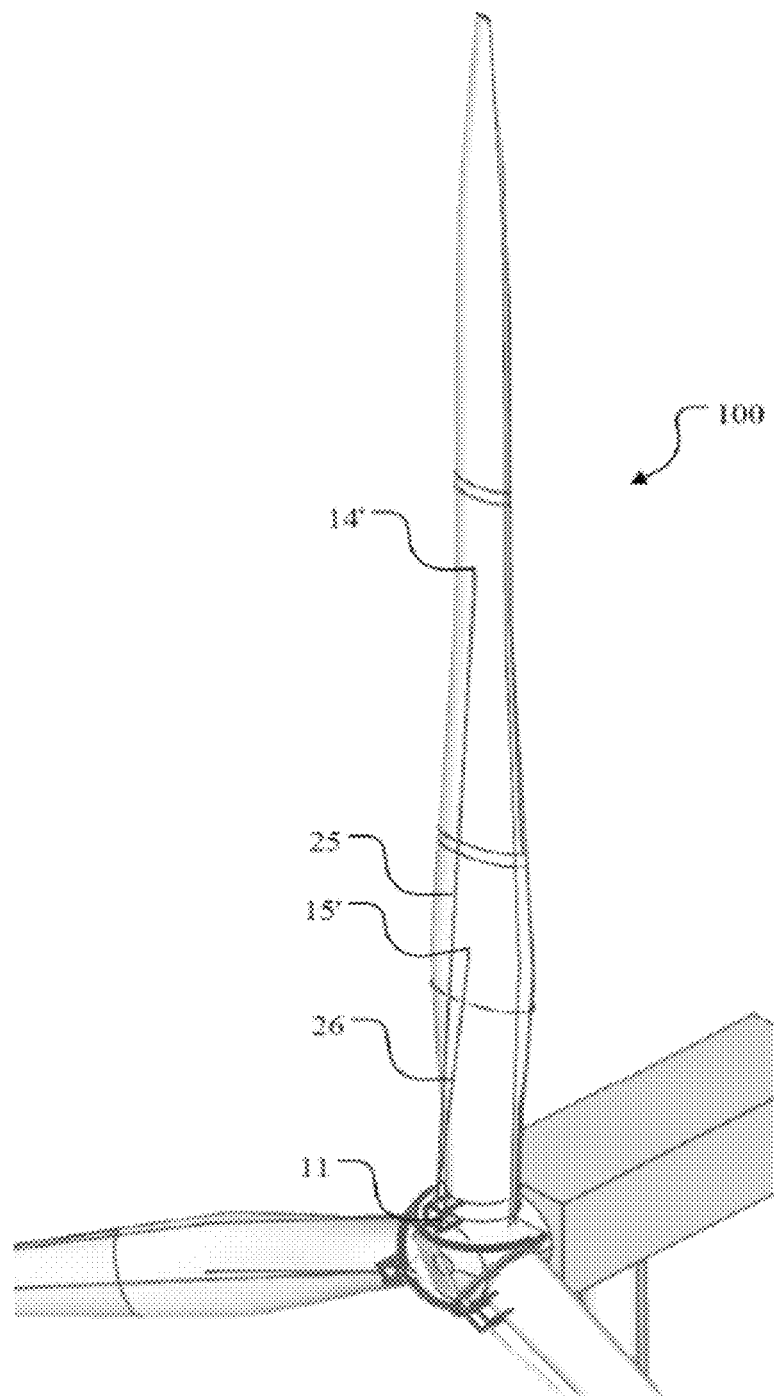
FIG. 9 presents space diagram of a rotor according to another embodiment of the present invention.

By referring to FIG. 9, it shows one more embodiment of the present invention. In the embodiment shown in FIG. 9, each blade is equipped with two blade reinforcing members 25 and 26. The blade reinforcing member 25 is permanently connected to the connecting bracket 11 at one end (the lower end) along the longitudinal axis, and directly connected to blade 1 at another end (upper end) in the middle-upper position of the blade, e.g. connecting point 14'. In the illustrated embodiment, the blade reinforcing member 26 is connected to the connecting bracket 11 at one end (the lower end) along the longitudinal axis, and directly connected to blade 1 in the longitudinal position closer than the connecting point 14', i.e. connecting point 15'. This is equivalent to providing multiple fulcrums at different longitudinal positions, and reduce the bending moment of the blade main beam in this section. In the embodiment shown, each group of blade reinforcing members is roughly along or parallel to the longitudinal axis of the blade. However, it can be inferred that the blade reinforcing members may be different in quantity and arranged in different ways.

Figure 10:
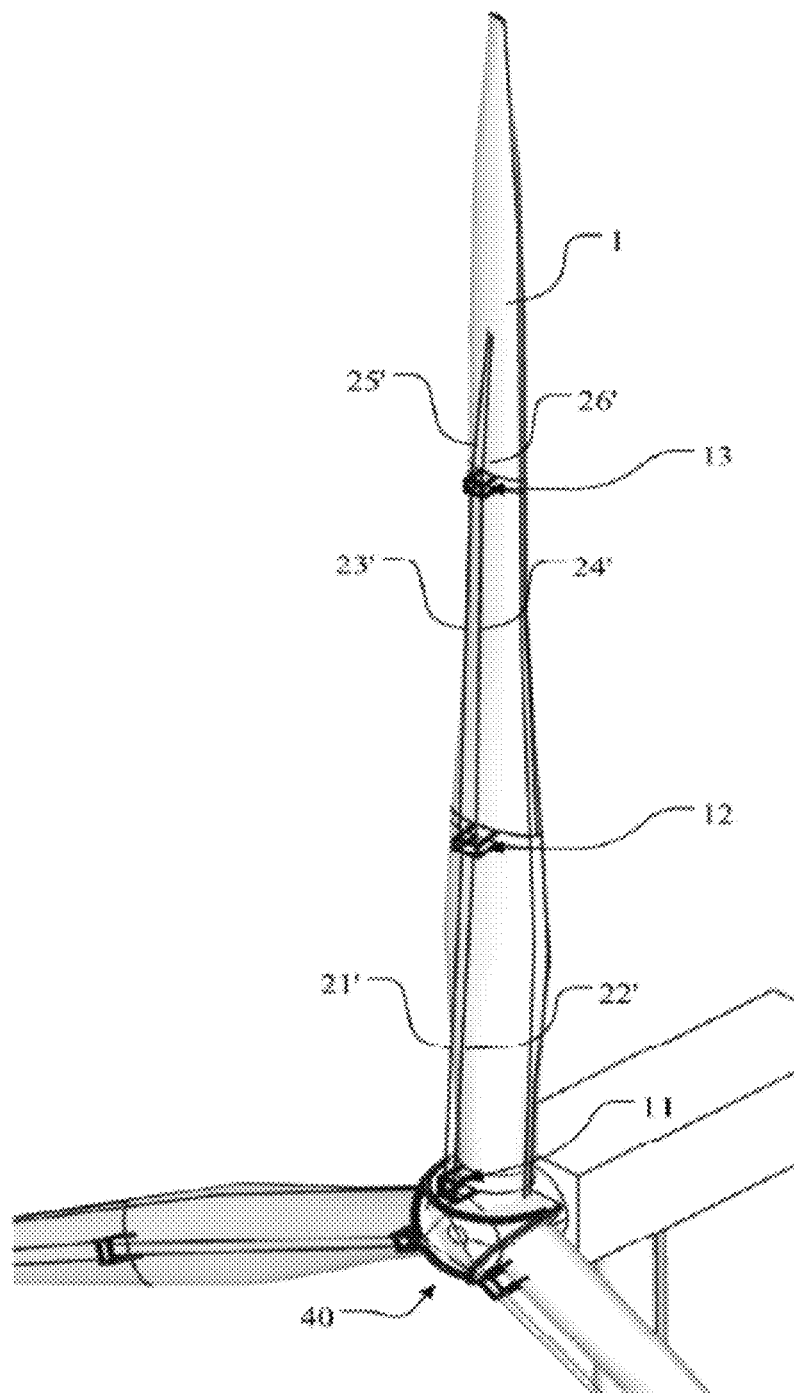
FIG. 10 presents space diagram of a rotor blade according to another embodiment of the present invention.

By referring to FIG. 10, it shows another embodiment of rotor blade. In the embodiment illustrated in FIG. 10, the end (upper end) of the blade reinforcing members 21' and 22' that not connected to the (first) connecting bracket of is connected to the second connecting bracket 12 instead of the blade at the connecting point. In the embodiment shown, the third connecting bracket 13 exists. The blade reinforcing members 23' and 24' are connected between the second and the third connecting brackets instead of the center connecting device 40. Furthermore, the other blade reinforcing members 25' and 26' are respectively connected to the third connecting bracket and the blade instead of the center connecting device 40. In the embodiment shown, the second connecting bracket 12 and the third connecting bracket 13 may be made from same materials of the (first) connecting bracket 11; however, it can be inferred to set other connecting structure and materials different form the connecting bracket 11. The involved technician should understand that all the types of combination between the blade reinforcing member or optional connecting structure (bracket) and the center connecting device belong to the scope of the present invention. For example, the blade reinforcing members 21-26 and 21'-26' are directly or indirectly, through the connecting brackets 11, 12 and 13, connected to the blade 1 or the blade shell and/or beam, and is separated from the blade shell by the connecting brackets 11, 12 and 13.

In the embodiment as shown in FIG. 10, by means of the rotor reinforcing device 10 according to the present invention, e.g. the blade reinforcing members and connecting brackets, it enlarges the cross section of the blade beam and improves the bending stiffness (EI) of the blade. By means of the blade reinforcing members longitudinally extending, especially parallel to the pitch axis or the aerodynamic center axis, it is good for promoting the bending stiffness (EI) of the blade in flapwise direction. More preferably, the blade reinforcing members arranged at both sides of the axis are good for promoting the bending stiffness (EI) of the blade in both flapwise and edgewise direction.

Although not indicated, it will be appreciated that integral type blade or sectional type blade is not critical for the present invention, and the rotor reinforcing device 10 according to the present invention is applicable to both types, which is within the scope of the present invention. However, in a preferable embodiment, the blade 100 may include multiple blade sections, e.g. three blade sections. The involved technicians can understand that the blade 100 may include more or less than three blade sections, which is within the scope of the present invention. E.g. by referring to FIG. 10, the connecting bracket, including the second connecting bracket and the third connecting bracket 12 and 13, may strengthen the connection between blade sections. Although not indicated, e.g. the first leg 31 is connected to the first blade section or its surface permanently or integrally, and the second leg 32 is connected to the adjacent blade section or its surface permanently or integrally. In blade assembly, between blade sections, especially their main beam, webs and blade shells may be connected in various proper methods, e.g. riveting or welding. Then, the first and the second leg may be permanently connected by connecting element, e.g. connecting rod 33, so as to form the connecting bracket crossing a span and longitudinally extending along the blade. In the embodiment shown, the adjacent blade sections are permanently connected in non-rotation way, so that it guarantees the integral stiffness of the blade during turbine operation. In such structure, the connecting bracket not only provides improved bending stiffness like beam through crossing a span in longitudinal direction (and/or transversal direction), but also improves the connection between the adjacent blade sections. Moreover, the symmetric setting of blade reinforcing members offsets part tension of the blade reinforcing members 21 and 22 on the blade and reduces the unbalance load on the center connecting device 40.

In the embodiment shown, the rotor reinforcing device may be installed outside the blade shell 2, especially the windward side of the blades (the arrow direction of W in FIG. 3B refers to the wind direction).

Preferably, the blade reinforcing member may have preferable structure, material and shape.

In preferable embodiment, the blade reinforcing member may have different cross-sectional shape, e.g. preferable roundness, or rectangle, square and oval as well. In addition, the cased cross section of the blade reinforcing member may have different shapes as well, e.g. roundness and oval, etc.

In a preferred embodiment, but not shown, it may be at least one, preferably all the blade reinforcing members are provided the outer structural member. Preferably, the cross section of outer structural member of the blade reinforcing member selects the casing shape according to the aerodynamics, so as to reduce the wind drag and noise. Particularly preferably, airfoil profile is selected as casing shape to produce lift force, which is good for rotation of the rotor blade.

In a preferable embodiment, at least one or preferably the whole blade reinforcing member are tensile reinforcements, preferably the high-strength tensile reinforcements, flexible tensile reinforcements and rope. Preferably, at least one or preferably the whole blade reinforcing members are ropes made from reinforced fiber composite, more preferably the carbon fiber rope. However, it can be inferred that the blade reinforcing member may embrace or be ropes of other types, e.g. ropes made from same materials of blades, such as glass fiber rope.

It should be understood that although the present description is in according with each embodiment described herein, it does not mean that each embodiment only has one individual technical proposal. The description is narrated in such way just for clarification, which shall be regarded as a whole, and the technical schemes in different embodiments may be properly combined to form other application method that can be understood by the technicians involved. The features of innovation disclosed in the description are not indispensable, and the features of innovation combined with the other existing configurations may create new technical proposal, which are all within the scope of the present invention as well.

The all of above are only the schematic specific mode of execution of the present invention, which is not used to limit the scope of the present invention. Any equivalent variation, modification or combination made by any involved technician without departing from the conception and principle of the present invention shall be under the protection of the present invention.

REFERENCE SIGNS LIST 1 blade
1' blade
2 blade shell
3 beam structure
4 main beam
5 shear web
6 hub
7 cabin
8 tower
10 rotor reinforcing device
11 first connecting bracket
12 second connecting bracket
13 second connecting bracket
14 connecting point
15 connecting point
16 connecting point
17 connecting point
18 guide member
20 the first group of blade reinforcing members
20' the second group of blade reinforcing members
21 blade reinforcing member
21' blade reinforcing member
22 blade reinforcing member
22' blade reinforcing member
23 blade reinforcing member
23' blade reinforcing member
24 blade reinforcing member
24' blade reinforcing member
25 blade reinforcing member
25' blade reinforcing member
26 blade reinforcing member
26' blade reinforcing member
31 first leg
32 second leg
33 connecting rod
40 center connecting device
41 plate-shaped connecting member
42 plate-shaped connecting member
43 plate-shaped connecting member
44 supporting structure
45 supporting member
46 supporting member
47 supporting member
48 guide slot
100 rotor
311 column element
312 column element
313 beam element
321 column element
322 column element
323 beam element

What is claimed is:

1. A rotor reinforcing device to reinforce a turbine rotor comprising:
a center connecting device configured to be fixed to a rotor hub;
a plurality of blade reinforcing members, each of the blade reinforcing members configured to be connected to said center connecting device and a rotor blade; and
a plurality of guide structures, each of said guide structures configured to guide the blade reinforcing members to rotate along with the rotor blade around a longitudinal axis of said rotor blade,
wherein each of said guide structures comprises a guide member and a guide slot, and
wherein said guide slot is in a form of a circular arc.

2. The rotor reinforcing device according to claim 1, wherein said center connecting device comprises a plurality of connecting members.

3. The rotor reinforcing device according to claim 2, wherein said center connecting device comprises a supporting structure to support said connecting members.

4. The rotor reinforcing device according to claim 3, wherein said supporting structure comprises a plurality of supporting members connected with each other.

5. The rotor reinforcing device as in any one of claims 1-4 comprises a plurality of connecting brackets used to connect said blade reinforcing members and said center connecting device.

6. The rotor reinforcing device according to claim 5, wherein each of said connecting brackets is configured to be fixed on the rotor blade by crossing certain span longitudinally along the rotor blade.

7. The rotor reinforcing device according to claim 5, wherein each of said guide structures to guide each of the blade reinforcing members and each of the connecting brackets to rotate along with the rotor blade around a longitudinal axis of the rotor blade.

8. The rotor reinforcing device according to claim 7, wherein said guide member fixedly attaching to each of the connecting brackets and said guide slot in the center connecting device.

9. The rotor reinforcing device according to claim 1, wherein said guide member comprises a plurality of rolling bearings.

10. A rotor comprises said rotor hub, multiple rotor blades connected to said rotor hub and the rotor reinforcing device as in any one of claims 1-4, or 5-9.

11. A rotor comprises said rotor hub, multiple rotor blades connected to said rotor hub and the rotor reinforcing device as in any one of claims 1-4, or 5-9, wherein said rotor blades are configured such that they can rotate around their longitudinal axes relative to said rotor hub.

12. The rotor according to claim 11, wherein each of said rotor blades is equipped with at least one of said blade reinforcing members and at least one of said connecting brackets.

13. The rotor according to claim 11, wherein each of said rotor blades is equipped with multiple said blade reinforcing members of which at least two are connected to one of the connecting brackets and one of the rotor blades at the roughly same lengthwise position of the rotor blade.

14. The rotor according to claim 11, wherein each of said rotor blades is equipped with multiple said blade reinforcing members of which at least two are connected to one of the connecting brackets and one of the rotor blades at the different lengthwise positions of the rotor blade.

15. The rotor according to claim 11, wherein each of said rotor blades is equipped with at least two groups of said blade reinforcing members of which each group comprises one of said blade reinforcing members or multiple said reinforcing members and wherein the reinforcing members in different groups are connected to one of the connecting brackets and one of the rotor blades at the different lengthwise positions of the rotor blade.

16. The rotor as in any one of claims 10-15, wherein the blade reinforcing members are configured to be applied to pre-stressed.

17. A wind turbine, comprising the rotor as in any one of claims 10-16.

18. A power generating equipment, comprising the rotor as in any one of claims 10-16, including wind turbine, ocean current turbine or tidal turbine.

* * * * *